(12) United States Patent
Derby et al.

(10) Patent No.: US 6,275,583 B1
(45) Date of Patent: Aug. 14, 2001

(54) CIRCUITS AND METHODS FOR IMPROVED NETWORK INTERFACE CIRCUIT PROTECTION

(75) Inventors: Jeffrey Haskell Derby, Chapel Hill; David Ross Thomas, Apex, both of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/047,985

(22) Filed: Mar. 25, 1998

(51) Int. Cl.[7] .......................... H04M 3/22; H04M 11/00
(52) U.S. Cl. ................... 379/412; 379/399; 379/93.05
(58) Field of Search .......................... 379/399, 412–414, 379/377, 387, 331, 93.05–93.07

(56) References Cited

U.S. PATENT DOCUMENTS

| | | | |
|---|---|---|---|
| 3,767,857 | 10/1973 | Colas et al. | 179/18 |
| 4,398,066 | 8/1983 | Sinberg | 179/70 |
| 4,564,725 | 1/1986 | Daisenberger | 179/8 A |
| 4,629,830 | 12/1986 | Daisenberger | 340/825.03 |
| 4,723,268 | 2/1988 | Newell et al. | 379/98 |
| 5,291,545 | * 3/1994 | Stahl | 379/377 |
| 5,615,255 | 3/1997 | Lemieux | 379/230 |

OTHER PUBLICATIONS

Terminal Equipment (TE); Attachment requirements for pan–European approval for connection to the analogue Public Switched Telephone Networks (PSTNs) of TE (excluding TE supporting the voice telephony service) in which network addressing, if provided, is by means of Dual Tone Multi Frequency (DTMF) Signalling, Technical Basis for Regulation, European Telecommunications Standards Institute Draft pr TBR 12, pp. 15–16 (Mar. 8, 1996).
Attachments to Public Switched Telephone Network (PSTN); General technical requirements for equipment connected to an analogue subscriber interface in the PSTN Chapter 2: DC characteristics, European Telecommunication Standard ETS 300 001, European Telecommunications Standards Institute, pp. 24–46 (Mar. 8, 1996).
Interface Between Data Circuit–Terminating Equipment (DCE) and the Public Switched Telephone Network (PSTN), EIA/TIA Standard, Electronic Industries Associationi EIA/TIA–496–A, pp. 20–21 (Sep. 28, 1989).

* cited by examiner

*Primary Examiner*—Wing F. Chan
(74) *Attorney, Agent, or Firm*—Myers Bigel Sibley & Sajovec, P.A.

(57) ABSTRACT

A network interface circuit includes an off-hook/on-hook circuit, responsive to the communications network, that provides an off-hook voltage substantially equal to the communications network voltage in an off-hook state and that provides an on-hook voltage in an on-hook state. A voltage controlled current source provides a load current which is proportional to a communications network voltage provided by the communications network. A divider circuit, responsive to the off-hook/on-hook circuit, provides an input voltage and produces an over-voltage, wherein the input voltage is proportional to off-hook or on-hook voltage. A clamping circuit limits the input voltage to one of a first or second predetermined value based on the operating mode and generates a current limited voltage. A control circuit, responsive to the over-voltage and the current-limited voltage and the operating mode and responsive to the off-hook/on-hook circuit, sets the network interface circuit in the off-hook state or the on-hook state based on the input voltage, the current-limited voltage, and the operating mode. Related methods and apparatus are also discussed.

33 Claims, 6 Drawing Sheets

CIRCUITS AND METHODS FOR IMPROVED NETWORK INTERFACE CIRCUIT PROTECTION

FIELD OF THE INVENTION

The present invention relates to the field of communications, and more particularly to the field of networked communications.

BACKGROUND OF THE INVENTION

Communications networks, such as a public switched telephone network (PSTN), may provide services to a subscriber-end device, such as a telephone or modem, by allowing the subscriber-end device to connect to the communications network. For example, a telephone may connect to the PSTN by entering an active state thereby enabling communication between the telephone and the PSTN. The active state may be referred to as off-hook and the inactive state may be referred to as on-hook.

The subscriber-end device may be required to exhibit certain electrical characteristics when connected to the communications network. Moreover, different communications networks may require different electrical characteristics and exhibit different failure modes. For example, the electrical termination characteristics of some countries may be met using a constant-resistance termination (constant-resistance mode) while other countries, such as France, may be met using a constant-current limiting termination (constant-current mode). Many subscriber-end devices, therefore, use a programmable network interface circuit (NIC) to provide the electrical characteristics for the particular communications network to which the subscriber-end device is connected.

FIG. 1 graphically illustrates the electrical characteristics of two exemplary communications networks. The line 101 shows the electrical characteristics, referred to as constant-resistance mode, of a telephone connected to a PSTN wherein the current is controlled by the NIC to present a constant resistive load to the PSTN in relation to the voltage provided by the communications network. The constant-resistance mode may present a low-resistance load of about 100 ohms or high-resistance load of about 300 ohms. The line 102 shows the electrical characteristics, referred to as constant-current mode, of a telephone connected to a PSTN wherein the current is kept constant over a range of voltages provided by the communications network.

The communications networks described above may not perform as specified. For example, a PSTN operating in constant-resistance mode may be specified to source a current not to exceed 120 milliamperes (ma) as shown by the dotted line in FIG. 1. If, however, a communications network failure occurs, the source current may exceed 120 ma, causing excessive power dissipation and thereby possibly damaging the NIC. Similarly, a PSTN operating in constant current mode may be specified to provide a network voltage not to exceed 70 volts. If, however, the voltage provided by the communications network exceeds the specified maximum voltage, the NIC may be damaged due to excess power dissipation.

Alternatively, a user may inadvertently connect the NIC to a communications network which is incompatible with the electrical characteristics described herein. For example, Private Branch Exchange (PBX) networks may provide a relatively large current to connected subscriber-end devices. The physical connection to the PBX, however, is such that a subscriber-end device intended for a PSTN may be mistakenly connected to the PBX. Consequently, the current provided by the PBX may cause excessive power dissipation in the NIC, thereby possibly damaging the NIC.

As illustrated in FIG. 2, existing systems may use an in-line device 202 to protect the NIC 201 from the damage described above. The in-line device 202 may be a fuse or resettable device (such as a relay) which de-couples the communications network 203 from the NIC 201 before NIC 201 is damaged. Fuses may need to be replaced once the failure occurs. Resettable devices may need to be reset once the failure occurs. Fuses and resettable devices may also be packaged in such a way so as to be undesirable for some applications requiring relatively high levels of integration. For example, a fuse or relay may be undesirable for use in an integrated modem of a laptop computer due to space and power restrictions. Moreover, a fuse or resettable device may not readily provide an indication that a failure has or is about to occur. For example, if the PSTN sources too much current, the user may be unaware that the NIC may soon fail unless the NIC is de-coupled from the communications network. In view of the above, there is a need for an improved NIC protection.

SUMMARY OF THE INVENTION

It is, therefore, an object of the present invention to provide improved network interface circuit protection.

It is another object of the present invention to allow reduced reliance on user intervention to avoid damage to the network interface circuit.

These and other objects are provided by a network interface circuit which operates in a constant-resistance mode or a constant-current mode within a communications network that provides a communications network voltage to the network interface circuit. An off-hook/on hook circuit provides an off-hook voltage in the off-hook state that is substantially equal to the communications network voltage and wherein the off-hook/on-hook circuit provides an on-hook voltage in the on-hook state. At least one feedback voltage is generated that is proportional to the off-hook voltage. At least one status signal is generated based on the feedback voltage. The state of the off-hook/on-hook circuit is controlled using the status signals and the operating mode. The present invention can decouple the network interface circuit from the communications network when the status signals indicate that the network interface circuit may be subject to excessive power dissipation.

In one embodiment, a network interface circuit includes an off-hook/on-hook circuit, responsive to the communications network, that provides an off-hook voltage substantially equal to the communications network voltage in an off-hook state and that provides an on-hook voltage in an on-hook state. A voltage controlled current source provides a load current which is proportional to a communications network voltage provided by the communications network. A divider circuit, responsive to the off-hook/on-hook circuit, provides an input voltage and produces an over-voltage, wherein the input voltage is proportional to off-hook or on-hook voltage. A clamping circuit limits the input voltage to one of a first or second predetermined value based on the operating mode and generates a current limited voltage. A control circuit, responsive to the over-voltage and the current-limited voltage and the operating mode and responsive to the off-hook/on-hook circuit, sets the network interface circuit in the off-hook state or the on-hook state based on the input voltage, the current-limited voltage, and the operating mode.

The present invention can reduce reliance on user intervention to avoid damage to the network interface circuit by controlling the state of the off-hook/on-hook circuit based on the operating mode and the input voltage. The network interface circuit may therefore be de-coupled from the communications network under the control of the present invention. According to the prior art, the user may need to remove the network interface circuit from the communications network manually. Alternatively, the user may need to replace or reset an in-line device to re-initiate a connection. Moreover, the user may not receive any indication of a fault which may lead to a loss of service until the user determines that the in-line device requires attention.

The present invention also may be embodied in a integrated fashion thereby providing protection for a network interface circuit in situations for which conventional in-line devices may not be well suited. For example, the present invention may be utilized to provide convenient protection to a network interface circuit within a laptop computer. Conventional in-line devices may not be well suited for use in laptop computers due to power and space requirements. Moreover, a laptop computer modem may not be readily accessed by a user, making it more difficult to reset or replace the in-line device. As will be appreciated by those skilled in the art, the present invention may be embodied as a method, apparatus, or computer program product.

DETAILED DESCRIPTION OF THE INVENTION

Figure 1:
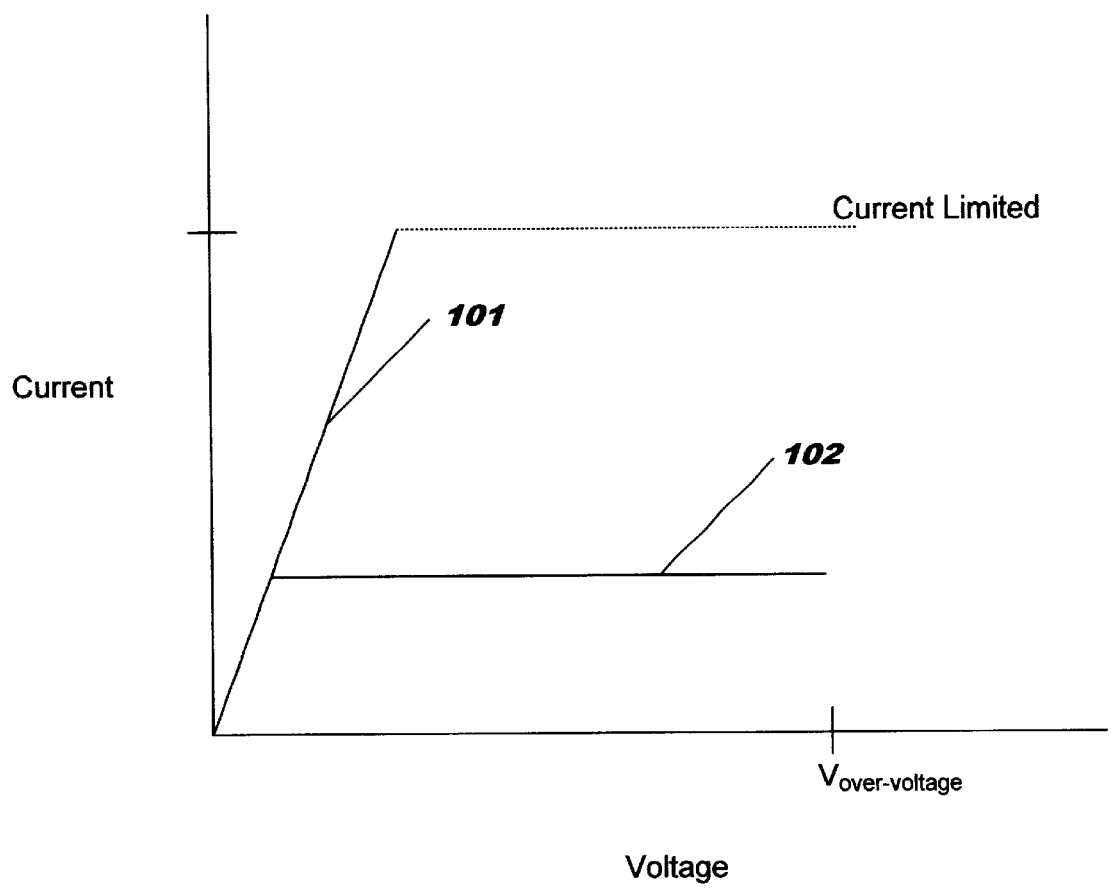
FIG. 1 is a graph illustrating the electrical characteristics of two exemplary communications networks according to the prior art.
Figure 2:
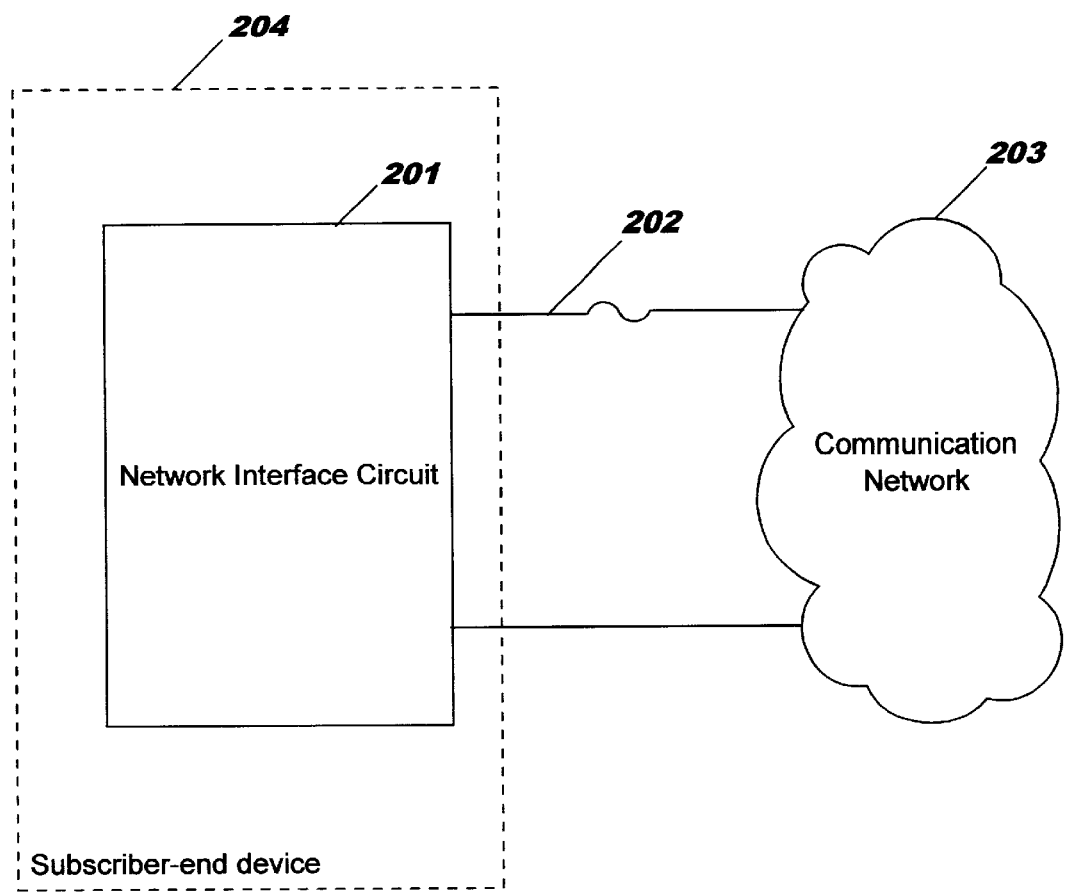
FIG. 2 is a block diagram illustrating a network interface circuit according to the prior art.

The present invention will now be described more fully hereinafter with reference to the accompanying drawings, in which a preferred embodiment of the invention is shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system or program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including hard disks, CD-ROMs, optical storage devices, or magnetic storage devices.

The present invention is also described herein using a flowchart illustration. It will be understood that each block of the flowchart illustration, and combinations of blocks in the flowchart illustration, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks.

These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block or blocks. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustration support combinations of means for performing the specified functions and combinations of steps for performing the specified functions. It will also be understood that each block of the flowchart illustration, and combinations of blocks in the flowchart illustration, can be implemented by special purpose hardware-based computer systems which perform the specified functions or steps, or combinations of special purpose hardware and computer instructions.

Figure 3A:
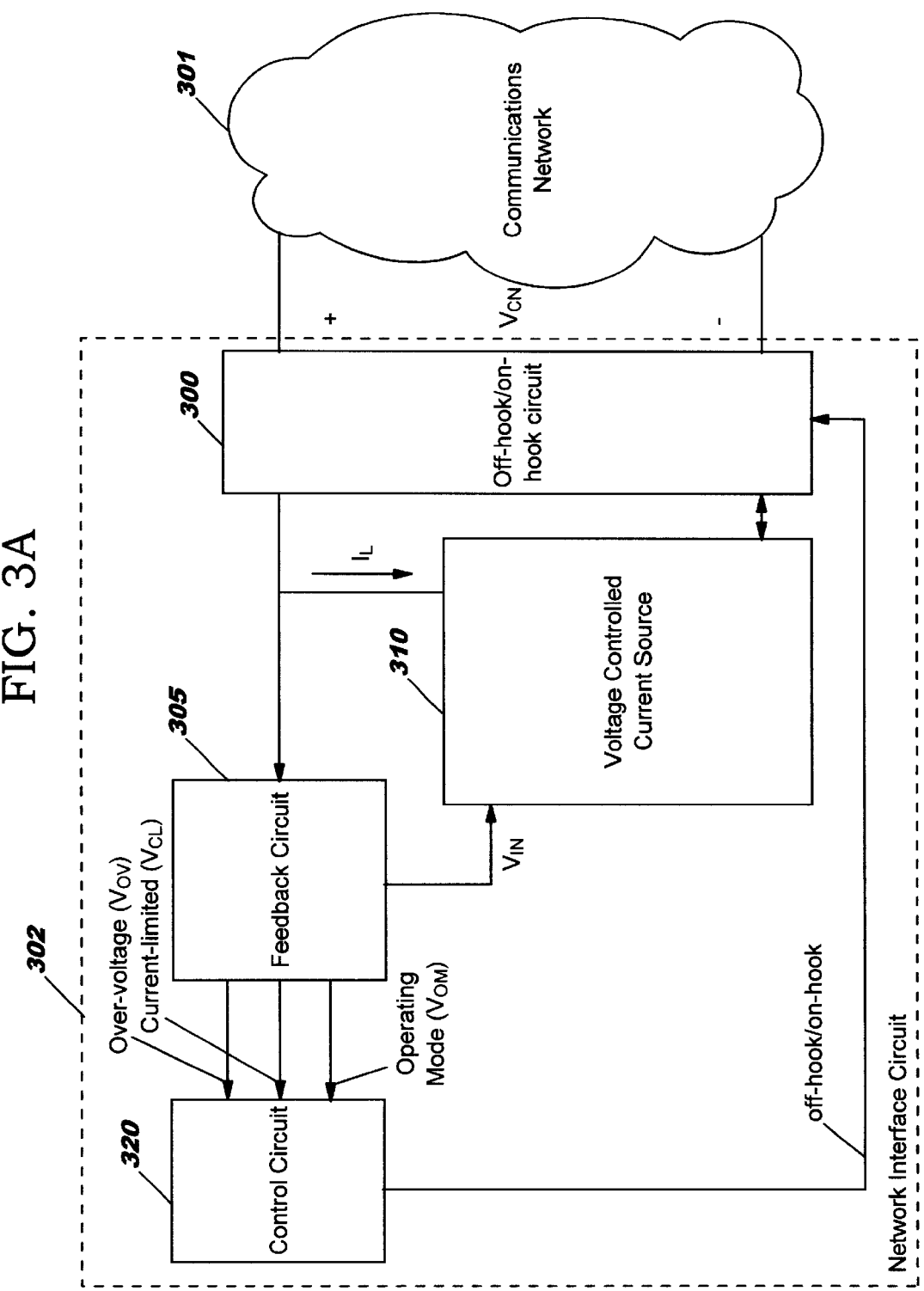
FIG. 3A is a block diagram illustrating a first network interface circuit according to the present invention.

FIG. 3A is a block diagram illustrating a first network interface circuit (NIC) 302 connected to a communications network 301. Communications network 301 may be a communications system, such as a PSTN or ISDN (Integrated Services Digital Network), that provides communications services to system subscribers via a subscriber-end device, such as a telephone. The subscriber-end device includes the NIC 302 which provides the proper electrical characteristics to support a connection to the communications network 301. Communications network 301 may provide communications services to the subscriber-end device by generating a communications network voltage, $V_{CN}$ across the NIC 302 when the NIC 302 enters the off-hook state. Alternatively, when the NIC 302 enters the on-hook state, communications services may be terminated. The communications network 301 may be a constant-resistance or constant-current type communications network described above. Consequently, the NIC 302 may provide the corresponding electrical characteristics. For example, the NIC 301 may function in a constant-resistance or constant-current operating mode. The operating mode may be selected manually or under computer program control. For example, the user may select the desired operating mode by setting a switch. Alternately, a computer program may select the operating mode.

NIC 302 includes a off-hook/on-hook circuit 300 that operates under the control of control circuit 320. For example, control circuit 320 may set the off-hook/on-hook circuit 300 to an off-hook or on-hook state. In the on-hook state, the off-hook/on-hook circuit 300 is open such that the communications network 301 is decoupled from the NIC 302. In the off-hook state, the off-hook/on-hook circuit 300 is closed such that the NIC 302 is coupled to the communications network 301. The control circuit, therefore, couples/decouples the NIC 302 to/from communications network 300. It should be understood that the term switch includes transistors and other similar electronic switching components. For example, the off-hook/on-hook circuit 300 may be constructed using field effect transistors (FETs) as a switch mechanism.

$V_{CN}$ is applied to the voltage controlled current source 310 and to the feedback circuit 305 when the off-hook/on-hook circuit 300 is closed (i.e., the NIC 302 is off-hook). The feedback circuit 305 generates feedback voltages based on the communications network voltage, $V_{CN}$. In particular, the feedback circuit 305 provides an input voltage, $V_{IN}$ (which is proportional to $V_{CN}$), to the voltage controlled current source 310. $V_{IN}$ causes the voltage controlled current source 310 to conduct a proportional load current, $I_L$ from the communications network 301. If, however, $V_{IN}$ exceeds a predetermined value, $V_{IN}$ is clamped to the predetermined value. The predetermined value indicates that the communications network 301 is a constant-resistance or constant-current type network. For example, a first predetermined value of $V_{IN}$ may be about 2.5 volts, indicating that the communications network 301 is a constant-resistance type network. Therefore, if $V_{IN}$ starts to exceed 2.5 volts, $V_{IN}$ is clamped. Alternatively, a second predetermined value of about 1.0 volt indicates that the communications network 301 is a constant-current type network. Therefore, if $V_{IN}$ starts to exceed 1.0 volt, $V_{IN}$ is clamped. The load current value is in accord with the electrical characteristics that correspond to the particular communications network. For example, in constant-resistance operating mode, the load current, $I_L$, may be drawn from the communications network 310 according to:

$$I_L = \frac{V_{CN}}{R_L}$$

where $R_L$ is the resistive load. Moreover, as $V_{CN}$ changes, $I_L$ also changes so as to keep $R_L$ constant until $I_L$ reaches the current limit value (such as 120 ma). If $V_{IN}$ reaches a value which corresponds to a maximum specified load current, the feedback circuit 305 clamps $V_{IN}$ to a value which, through the voltage controlled current source 310, limits the load current and the power dissipation. In constant-current operating mode, the voltage controlled current source 310 sources a constant load current which is in accord with the corresponding electrical characteristic by clamping $V_{IN}$ to the value which corresponds to the required load current. For example, if the load current is to be 50 ma and $R_L$ equals 20 ohms, $V_{IN}$ will be clamped to 1.0 volt so as to limit the load current to 50 ma. It should be understood herein that the term proportional includes directly proportional, inversely proportional, linearly proportional, and non-linearly proportional.

The feedback circuit 305 also generates status signals for the control circuit 320 that reflect the communications network conformance with the electrical characteristics for the particular operating mode. In particular, in constant-current operating mode, the feedback circuit 305 may provide an over-voltage signal ($V_{OV}$) that is proportional to the communications network voltage in the off-hook state. $V_{OV}$ may indicate that the voltage provided by the communications network exceeds the specified maximum. The value of $V_{OV}$ may be a third predetermined value which indicates that $V_{CN}$ has exceeded the specified maximum voltage. For example, the third predetermined value may in the range between about 60 volts and 80 volts. In constant-resistance operating mode, the feedback circuit 305 may provide a current limited voltage ($V_{CL}$) to the control circuit 320 indicating that the load current has reached the specified maximum. In addition, the feedback circuit 305 may provide an indication of the particular operating mode to the control circuit 320. It should be understood that two status signals may be embodied by a single electrical signal which exhibits two states. Consequently, although the above description recites two status signals, the present invention may be practiced using a single signal having two states.

The control circuit 320 controls the state of the off-hook/on-hook circuit 300 in accord with the status signals and operating mode indication provided by the feedback circuit 305. If the status signals and operating mode indicate that the NIC 302 may be subject to excess power dissipation, the control circuit 320 decouples the NIC 320 from the communications network 301 by setting the off-hook/on-hook circuit 300 in the on-hook state. For example, in constant-resistance operating mode, when $V_{CL}$ indicates that the load current equals the maximum specified value, control circuit 320 sets the off-hook/on-hook circuit 300 in the on-hook state, thereby reducing the likelihood that the excess power dissipation will damage the NIC 302. Similarly, in constant-current operating mode, $V_{OV}$ may indicate that $V_{CN}$ has reached the maximum specified value. Consequently, control circuit 320 sets the off-hook/on-hook circuit 300 in the on-hook state, thereby reducing the likelihood that the excess power dissipation will damage the NIC 302. The control circuit 320 may include a general or special purpose computer device running a computer program wherein the voltages and signals described herein may be processed to provide the control circuit 320 functions.

Figure 3B:
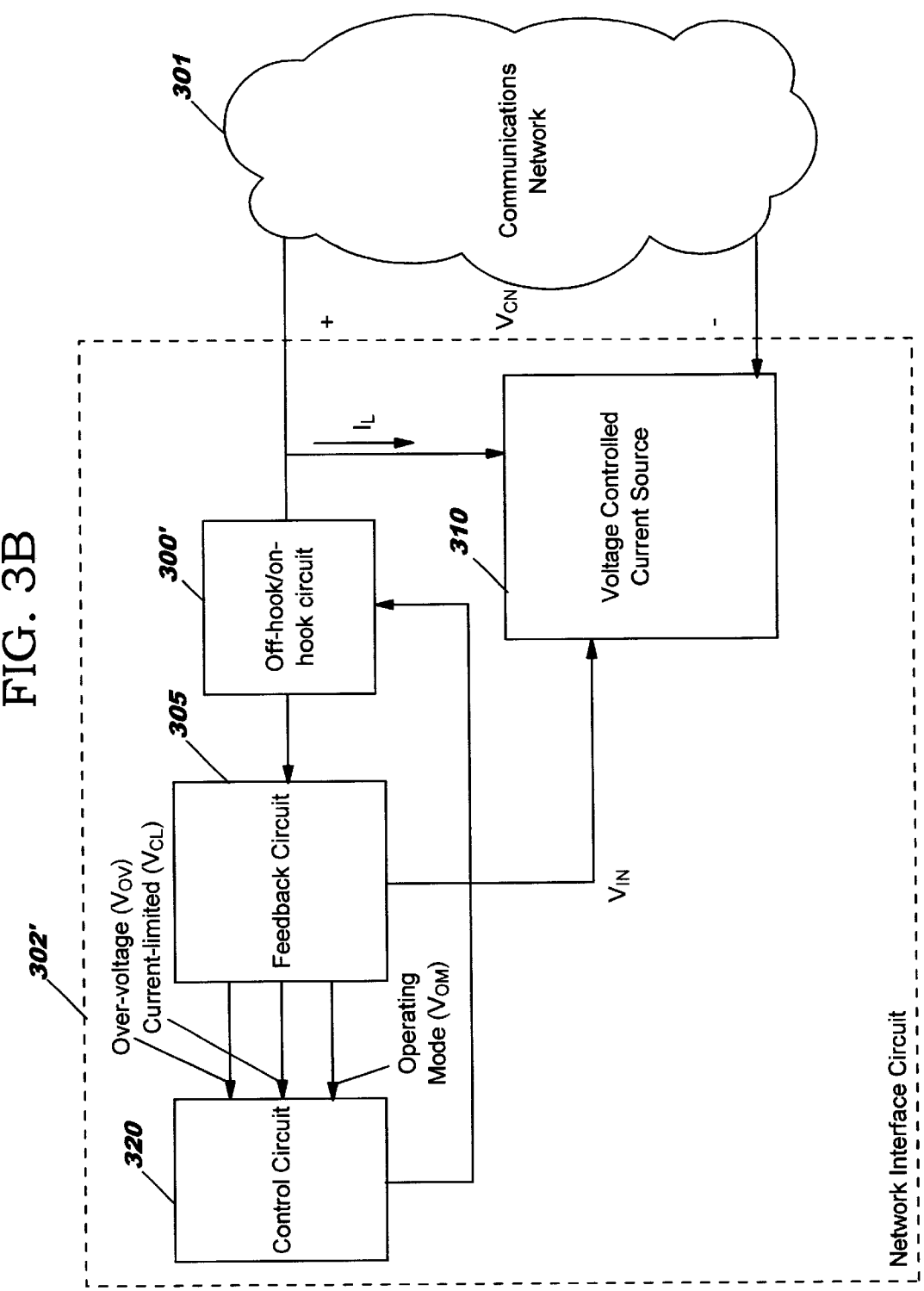
FIG. 3B is a block diagram illustrating a second network interface circuit according to the present invention.

FIG. 3B is a block diagram illustrating a second network interface circuit (NIC) 302' connected to a communications network 301 wherein the off-hook/on-hook circuit 300' is isolated from the load current sourced by the communications network 301. The off-hook/on-hook circuit 300' is used to couple/decouple the communications network voltage to/from the feedback circuit 305. For example, in the off-hook state the communications network voltage is provided to the feedback circuit 305 and the voltage controlled current source 310 functions as described above. In the on-hook, the communications network voltage is decoupled from the feedback circuit 305, thereby causing $V_{IN}$ to be about 0 volts, but remains coupled to the voltage controlled current source 310. Accordingly, the voltage controlled current source 310 draws a load current of about 0 amperes. The off-hook/on-hook circuit 300' therefore allows the NIC 302' to remain coupled to the communications network while guarding against excessive load current.

Figure 4:
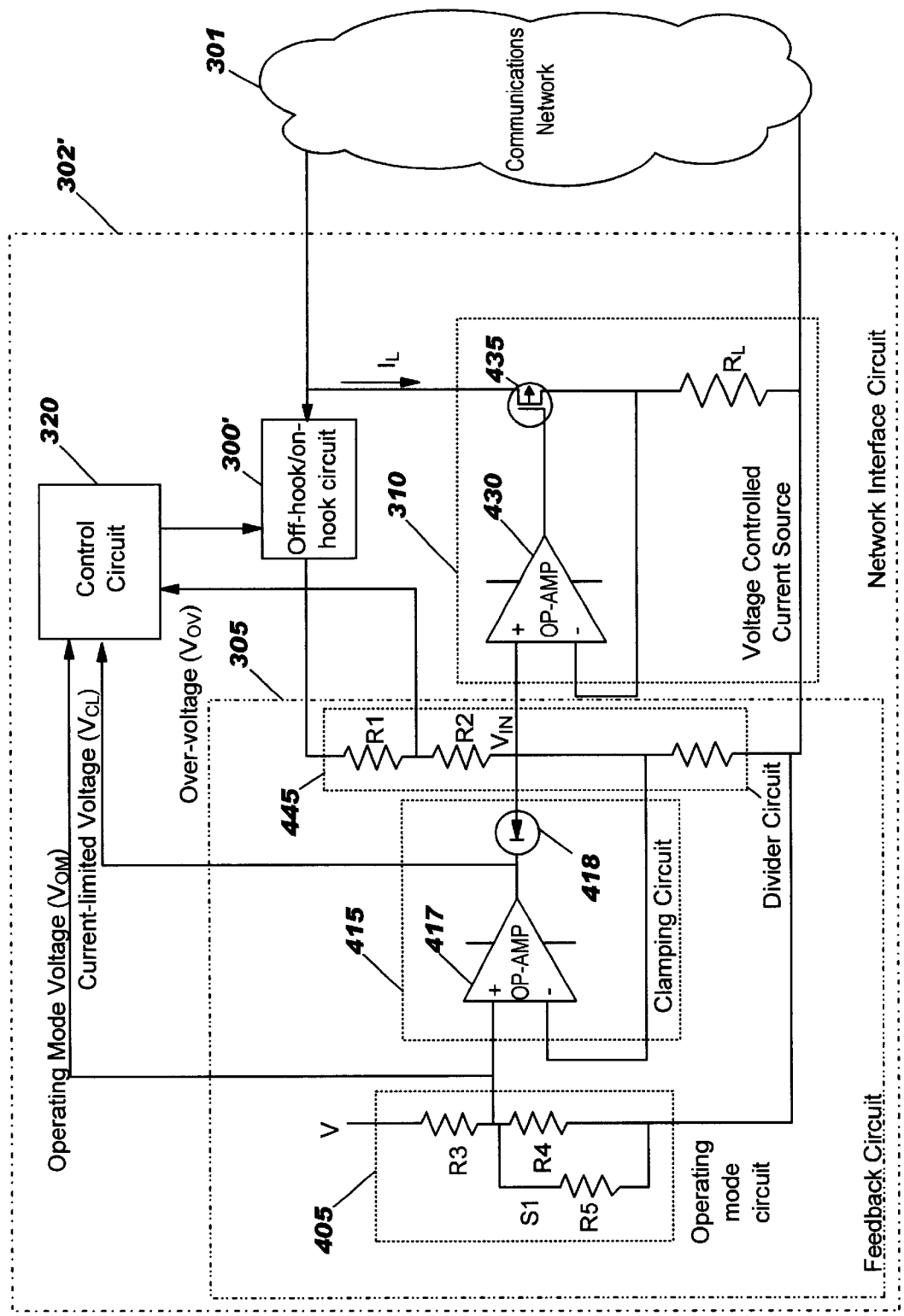
FIG. 4 is an embodiment of a network interface circuit according to the present invention.

FIG. 4 is a circuit diagram illustrating an embodiment of a network interface circuit 302' according to the present invention. The voltage controlled current source 310 includes an op-amp 430 having a positive and negative input terminal and an output terminal. Op-amp 430 functions as a differential amplifier with a gain of G that multiplies the voltage difference between the negative and positive input terminals to produce an output voltage at the output terminal. A portion of the output voltage is returned to the negative input terminal so as to stabilize the output voltage. The input voltage, $V_{IN}$, is applied to the positive terminal of the op-amp 430.

Field Effect Transistor (FET) 435 has a controlling electrode referred to as the gate and a pair of controlled electrodes, referred to as the source and the drain. When a voltage bias is applied to the gate of FET 435, a channel is created to allow current to flow from the source electrode to the drain electrode. The current that flows from the source electrode to the drain electrode is generally proportional to the current flowing into the gate electrode. The gate of FET 435 is coupled to the output terminal of the op-amp 430. Op-amp 430 generates an output voltage which biases the gate of FET 435, causing a load current to flow through FET 435 and resistor $R_L$. The load current flowing through $R_L$ causes a voltage to develop across $R_L$ which is fed-back to the negative terminal of op-amp 435, which in-turn affects the voltage at the output terminal of op-amp 430. As is known to one skilled in the art, the load current will flow according to:

$$I_L = \frac{V_{IN}}{R_L}$$

Consequently, the load current, $I_L$, is controlled by the voltage, $V_{IN}$, applied to the positive terminal of the op-amp 430. Although the voltage controlled current source 310 is described herein as using a FET, it should be understood that other electronic switching devices may be used. For example, the present invention may be practiced using a bipolar transistor, Darlington configuration, or other device known in the art.

The off-hook/on-hook circuit 300' provides an off-hook voltage, that is substantially equal to the communications network voltage, to the divider circuit 445 when the off-hook/on-hook circuit 300' is in the off-hook state. Alternately, the off-hook/on-hook circuit 300' provides an on-hook voltage, that is substantially equal to 0 volts, to the divider circuit 445 when the off-hook/on-hook circuit is in the on-hook state. The on-hook voltage causes $V_{IN}$ to be about 0 volts, thereby causing the load current to be about 0 amperes.

The feedback circuit 305 includes an operating mode circuit 405 for indicating the operating mode of the communications network 301 to which the NIC 302' is connected. The operating mode circuit 405 includes two resistors, R3 and R4 arranged in series, forming a voltage divider producing an operating mode voltage, $V_{OM}$. In addition, R5 may be placed in parallel with R4 using the switch S1 to select the operating mode. For example, when S1 is open, R3 and R4 divide the applied voltage according to the ratio of R3 and R4. When S1 is closed, R4 and R5 combine to produce a lower resistance than that of R4 alone. Consequently, the mode voltage 410 is less when S1 is closed than when S1 is open. In one embodiment, the operating mode voltage 410 for constant-resistance operating mode is about 2.5 volts and the operating mode voltage 410 for constant-current operating mode is about 1.0 volt.

The feedback circuit 305 includes a divider circuit 445 which accepts an off-hook or on-hook voltage and generates a proportional input voltage, $V_{IN}$, at the positive terminal of op-amp 430 using two serial resistors: R1 and R2. The divider circuit 445 produces an over-voltage across R2 that is used to determine the corresponding value of $V_{CN}$ in the off-hook state. In the preferred embodiment, a switch is used to place or remove a resistor, $R_{HP}$, in parallel with R2. When the switch is closed, $R_{HP}$ and R2 are in parallel and select the high-resistance mode (i.e., 300 ohms). When the switch is open, $R_{HP}$ and R2 are not in parallel and select the low-resistance mode (i.e., 100 ohms). The switch can be set under user control or under computer program control.

The feedback circuit 305 also includes a clamping circuit 415 for limiting the value of the input voltage, $V_{IN}$, at the positive input terminal of op-amp 430. The clamping circuit 415 limits $V_{IN}$ to the value of the operating mode voltage generated by the operating mode circuit 405. The clamping circuit 415 includes an op-amp 417 having a positive input terminal, a negative input terminal, and an output terminal. The output terminal of op-amp 417 is coupled to the cathode of diode 418. The anode of diode 418 is coupled to the positive input terminal of op-amp 430 and fed-back to the negative input terminal of op-amp 417 so that $V_{IN}$ is connected to the negative terminal of op-amp 417. Thus op-amp 417 compares $V_{IN}$ to the operating mode voltage, $V_{OM}$. Initially, the voltage produced at the output terminal of op-amp 417 will be saturated, producing a maximum current limited voltage, $V_{CL}$, reverse biasing diode 418. As $V_{IN}$ increases, the difference between $V_{IN}$ and $V_{OM}$ decreases, thereby causing $V_{CL}$ to decrease. As $V_{CL}$ decreases, the reverse bias voltage across diode 418 decreases. When $V_{IN}$ equals $V_{OM}$, $V_{CL}$ causes diode 418 to be forward biased, thereby clamping $V_{IN}$ to a value which is substantially equal to the operating mode voltage. In particular, the values of $V_{CL}$ indicating that $I_L$ has reached the maximum specified current may be a fourth predetermined value. In one embodiment, $V_{CL}$ is about 1.9 volts for an operating mode voltage of 2.5 volts and about 0.4 volts for an operating mode voltage of 1.0 volt.

Figure 5:
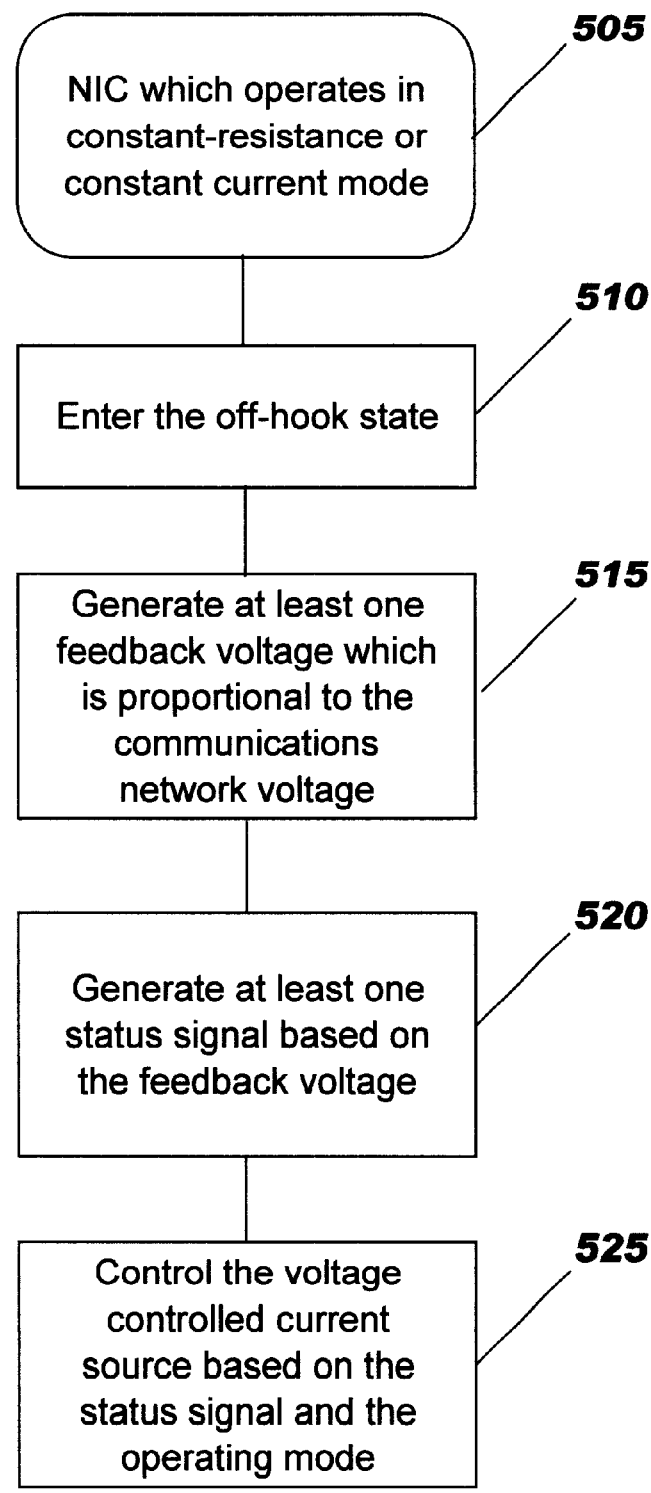
FIG. 5 is a flow chart illustrating operations of a network interface circuit according to the present invention.

FIG. 5 is a flowchart illustrating operations of a network interface circuit according to the present invention. The NIC operates in a constant-current operating mode or a constant-resistance operating mode (Block 505). The operating mode may be selected manually or under computer program control. For example, the user may select the desired operating mode by setting a switch. The NIC connects to the communications network by entering the off-hook state (Block 510). The NIC generates at least one feedback voltage which is proportional to the communications network voltage, $V_{CN}$, provided by the communications network when the NIC is in the off-hook state (Block 515). The NIC generates at least one status signal based on the feedback voltage (Block 520). The NIC controls the off-hook/on-hook state using the at least one status signal and the operating mode (Block 525). If the at least one status signal indicates a condition which may cause damage to the NIC, the voltage controlled current source decouples the NIC from the communications network by entering the on-hook state.

The present invention can reduce reliance on user intervention to avoid damage to the network interface circuit by controlling the state of the off-hook/on-hook circuit based on the operating mode and the input voltage. The network interface circuit may therefore be decoupled from the communications network under the control of the present invention. According to the prior art, the user may need to remove the network interface circuit from the communications network manually. Alternatively, the user may need to replace or reset an in-line device to re-initiate a connection. Moreover, the user may not receive any indication of a fault which may lead to a loss of service until the user determines that the in-line device requires attention.

The present invention also may be embodied in a integrated fashion thereby providing protection for a network interface circuit in situations for which conventional in-line devices may not be well suited. For example, the present invention may be utilized to provide convenient protection to a network interface circuit within a laptop computer. Conventional in-line devices may not be well suited for use in laptop computers due to power and space requirements. Moreover, a laptop computer modem may not be readily accessed by a user, making it more difficult to reset or replace the in-line device. As will be appreciated by those skilled in the art, the present invention may be embodied as a method, apparatus, or computer program product.

The present invention can reduce reliance on user intervention to avoid damage to the network interface circuit by controlling the state of the off-hook/on-hook circuit based on the operating mode and the input voltages. The network interface circuit is decoupled from the communications network under the control of the present invention. According to the prior art, the user may need to remove the network interface circuit from the communications network manually. Alternatively, the user may need to replace or reset an in-line device to re-initiate a connection. Moreover, the user may not receive any indication of a fault which may lead to a loss of service until the user determines that the in-line device requires attention.

The present invention also may be embodied in an integrated fashion thereby allowing protection for a network interface circuit in situations for which conventional in-line devices may not be well suited. For example, the present invention may be utilized to provide convenient protection to a network interface circuit within a laptop computer. Conventional in-line devices may not be well suited for use in laptop computers due to power and space requirements. Moreover, a laptop computer modem may not be readily accessed by a user, making it more difficult to reset or replace the in-line device.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A network interface circuit which operates in a constant-resistance operating mode or a constant-current operating mode within a communications network that provides a communications network voltage to the network interface circuit and that interfaces the communications network to a subscriber-end device, the network interface circuit comprising:

an off-hook/on-hook circuit, responsive to the communications network, that provides an off-hook voltage substantially equal to the communications network voltage in an off-hook state and that provides an on-hook voltage in an on-hook state;

a divider circuit, responsive to the off-hook/on-hook circuit, that provides an input voltage and provides an over-voltage, wherein the input voltage is proportional to off-hook or on-hook voltage;

a voltage controlled current source, responsive to the input voltage and the communications network, that provides a load current that is proportional to the input voltage;

a clamping circuit, responsive to the input voltage, that limits the input voltage to one of a first or second predetermined value based on the operating mode and generates a current-limited voltage; and a control circuit, responsive to the over-voltage and the current-limited voltage and the operating mode and responsive to the off-hook/on-hook circuit, that sets the network interface circuit in the off-hook state or the on-hook state based on the input voltage, the current-limited voltage, and the operating mode.

2. The circuit of claim 1 wherein said clamping circuit comprises:

an operating mode circuit that produces an operating mode voltage according to one of the constant-resistance operating mode or the constant-current operating mode; and a circuit, responsive to the operating mode circuit and responsive to the voltage controlled current source, that clamps the input voltage to a value substantially equal to the operating mode voltage and which produces a current limited voltage based on the clamped input voltage and the operating mode voltage.

3. The circuit of claim 1 wherein the first predetermined value is about 2.5 volts and the second predetermine value is about 1.0 volt.

4. The circuit of claim 2 wherein said control circuit comprises:

a circuit, responsive to the off-hook/on-hook circuit and responsive to the operating mode, that sets the off-hook/on-hook circuit in the off-hook state if the operating mode is constant-current and the over-voltage exceeds a third predetermined value; and a circuit, responsive to the off-hook/on-hook circuit and responsive to the operating mode, that sets the off-hook/on-hook circuit in the off-hook state if the operating mode is constant-resistance and the current limited voltage is approximately equal to a fourth predetermined value.

5. The circuit of claim 4 wherein the third predetermined value is in the range between about 60 volts and 80 volts and wherein the fourth predetermined value is in the range between about 0.4 volts and 1.9 volts.

6. The circuit of claim 1 wherein said off-hook/on-hook circuit comprises:

an off-hook/on-hook circuit that couples the communications network to the network interface circuit in an off-hook state and that decouples the network interface circuit from the communications network in an on-hook state, wherein the communications network voltage is provided to the network interface circuit when the off-hook/on-hook circuit is in the off-hook state and wherein the communications network voltage is removed from the network interface circuit when the off-hook/on-hook circuit is in the on-hook state.

7. The circuit of claim 6 wherein said off-hook/on-hook circuit comprises at least one transistor having a controlling electrode and a pair of controlled electrodes, the pair of controlled electrodes being serially coupled between the network interface circuit and the communications network and the controlling electrode being coupled to control circuit.

8. A method of protecting a network interface circuit which operates in a constant-resistance mode or a constant-current mode within a communications network which provides a communications network voltage to the network interface circuit, the method comprising the steps of:

setting an off-hook/on-hook circuit to an off-hook state wherein the off-hook/on-hook circuit provides an off-hook voltage in the off-hook state that is substantially equal to the communications network voltage and wherein the off-hook/on-hook circuit provides an on-hook voltage in the on-hook state;

generating at least one feedback voltage which is proportional to the off-hook voltage;

generating at least one status signal based on the feedback voltage; and controlling the state of the off-hook/on-hook circuit based on the status signals and the operating mode.

9. The method of claim 8 wherein said step of generating at least one status signal comprises the steps of:

clamping the input voltage to a first predetermined value if the input voltage exceeds the first predetermined value; and generating a current limited voltage that is proportional to the clamped input voltage.

10. The method of claim 8 wherein said step of generating at least one status signal comprises the steps of:
   clamping the input voltage to a second predetermined value if the input voltage exceeds the second predetermined value; and
   generating an over-voltage that is proportional to the off-hook voltage.

11. The method of claim 8 wherein said step of controlling comprises the steps of:
   setting the off-hook/on-hook circuit in the on-hook state when a constant-current mode is selected and the status signal indicates an over-voltage condition; and
   setting the network switch in the on-hook state if a constant-resistance mode is selected and the status signal indicates a current limit condition.

12. A method of protecting a network interface circuit connected to a communications network which provides a communications network voltage to the network interface circuit comprising the steps of:
   setting an off-hook/on-hook circuit to an off-hook state wherein the off-hook/on-hook circuit provides an off-hook voltage in the off-hook state that is substantially equal to the communications network voltage and wherein the off-hook/on-hook circuit provides an on-hook voltage in the on-hook state;
   generating an input voltage which is proportional to the off-hook voltage;
   generating an over-voltage which is proportional to the off-hook voltage;
   clamping the input voltage to a first predetermined value if the input voltage exceeds the first predetermined value;
   setting the off-hook/on-hook circuit in the on-hook state if a constant-resistance mode is selected and the input voltage is clamped to the first predetermined value;
   clamping the input voltage to a second predetermined value if the input voltage exceeds the second predetermined value; and
   setting the off-hook/on-hook circuit in the on-hook state if a constant-current mode is selected and the over-voltage exceeds a third predetermined value.

13. The method of claim 12 wherein said step of clamping the input voltage to a first predetermined value comprises the steps of:
   generating an operating mode voltage according to the constant-resistance operating mode; and
   clamping the input voltage to value which is substantially equal to the operating mode voltage.

14. The method of claim 13 wherein the operating mode voltage is about 2.5 volts.

15. The method of claim 12 wherein said step of clamping the input voltage to a second predetermined value comprises the steps of:
   generating an operating mode voltage according to the constant current operating mode; and
   clamping the input voltage to value which is substantially equal to the operating mode voltage.

16. The method of claim 15 wherein the operating mode voltage is about 1.0 volts.

17. The method of claim 12 wherein the first predetermined value is about 2.5 volts.

18. The method of claim 12 wherein the second predetermined value is about 1.0 volts.

19. The method of claim 12 wherein the third predetermined value is in the range between about 60 volts and 80 volts.

20. Apparatus for protecting a network interface circuit which operates in a constant-resistance or a constant-current operating mode within a communications network which provides a communications network voltage to the subscriber-end device, the means comprising:
   means for setting an off-hook/on-hook circuit to an off-hook state wherein the off-hook/on-hook circuit provides an off-hook voltage in the off-hook state that is substantially equal to the communications network voltage and wherein the off-hook/on-hook circuit provides an on-hook voltage in the on-hook state;
   means for generating at least one feedback voltage which is proportional to the off-hook voltage;
   means for generating at least one status signal based on the feedback voltage; and
   means for controlling the state of the off-hook/on-hook circuit based on the at least one status signal and the operating mode.

21. The apparatus of claim 20 wherein said means for generating at least one status signal comprises:
   means for clamping the input voltage to a first predetermined value if the input voltage exceeds a the first predetermined value; and
   means for generating a current limited voltage that is proportional to the clamped input voltage.

22. The apparatus of claim 20 wherein said means for generating at least one status signal comprises:
   means for clamping the input voltage to a second predetermined value if the input voltage exceeds the second predetermined value; and
   means for generating an over-voltage that is proportional to the off-hook voltage.

23. The apparatus of claim 20 wherein said means for controlling comprises:
   means for setting the off-hook/on-hook circuit in an on-hook state if a constant-current mode is selected and the status signal indicates an over-voltage condition; and
   means for setting the off-hook/on-hook circuit in the on-hook state if a constant-resistance mode is selected and the status signal indicates a current limit condition.

24. The apparatus of claim 20 wherein said off-hook/on hook is responsive to the communications network and conducts a load current sourced by the communications network to the network interface circuit in the off-hook state.

25. The apparatus of claim 20 wherein said off-hook/on hook circuit is responsive to the communications network and is isolated from a load current sourced by the communications network to the network interface circuit in the off-hook state.

26. Apparatus for protecting a network interface circuit connected to a communications network which provides a communications network voltage to the network interface circuit comprising:
   means for setting an off-hook/on-hook circuit to an off-hook state wherein the off-hook/on-hook circuit provides an off-hook voltage in the off-hook state that is substantially equal to the communications network voltage and wherein the off-hook/on-hook circuit provides an on-hook voltage in the on-hook state;
   means for generating an input voltage which is proportional to the off-hook voltage;

means for generating an over-voltage which is proportional to the off-hook voltage;
   means for clamping the input voltage to a first predetermined value if the input voltage exceeds the first predetermined value;
   means for setting the off-hook/on-hook circuit in the on-hook state if a constant-resistance mode is selected and the input voltage is clamped to the first predetermined value;
   means for clamping the input voltage to a second predetermined value if the input voltage exceeds the second predetermined value; and
   means for setting the off-hook/on-hook circuit in the on-hook state if a constant-current mode is selected and the over-voltage exceeds a third predetermined value.

27. The apparatus of claim 26 wherein said means for clamping the input voltage to a first predetermined value comprises:
   means for generating a operating mode voltage according to the constant-resistance operating mode; and
   means for clamping the input voltage to value which is substantially equal to the operating mode voltage.

28. The apparatus of claim 27 wherein the operating mode voltage is about 2.5 volts.

29. The apparatus of claim 26 wherein said means for clamping the input voltage to a second predetermined value comprises:
   means for generating an operating mode voltage according to the constant-current operating mode; and
   means for clamping the input voltage to a value which is substantially equal to the operating mode voltage.

30. The apparatus of claim 29 wherein the operating mode voltage is about 1.0 volts.

31. The apparatus of claim 26 wherein the first predetermined value is about 2.5 volts.

32. The apparatus of claim 26 wherein the second predetermined value is about 1.0 volts.

33. The apparatus of claim 26 wherein the third predetermined value is in the range between about 60 volts and 80 volts.

* * * * *